(12) United States Patent
Li

(10) Patent No.: US 7,656,653 B2
(45) Date of Patent: Feb. 2, 2010

(54) DRIVE BRACKET ASSEMBLY

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 148 days.

(21) Appl. No.: 11/850,043

(22) Filed: Sep. 5, 2007

(65) Prior Publication Data
US 2009/0040711 A1 Feb. 12, 2009

(30) Foreign Application Priority Data
Aug. 10, 2007 (CN) .................... 2007 2 0200805 U

(51) Int. Cl.
H05K 5/00 (2006.01)
H05K 7/16 (2006.01)
A47B 81/00 (2006.01)
A47G 29/00 (2006.01)
E05C 19/10 (2006.01)

(52) U.S. Cl. .................. 361/679.33; 361/726; 361/727; 312/223.2; 312/265.6; 292/107; 206/701

(58) Field of Classification Search ......... 361/724–727, 361/683, 679.01–679.45, 679.55–679.59; 312/223.1, 223.2, 257.1–265.6; 292/19.107, 292/129, 146, 175
See application file for complete search history.

(56) References Cited

U.S. PATENT DOCUMENTS

| 5,944,398 | A | * | 8/1999 | Wu ......................... 312/223.2 |
| 6,157,532 | A | * | 12/2000 | Cook et al. ............. 361/679.57 |
| 6,257,682 | B1 | * | 7/2001 | Liu et al. .................. 312/223.2 |
| 6,882,527 | B2 | | 4/2005 | Wang et al. |

* cited by examiner

Primary Examiner—Jayprakash N Gandhi
Assistant Examiner—Nidhi Desai
(74) Attorney, Agent, or Firm—Frank R. Niranjan

(57) ABSTRACT

A drive bracket assembly includes a back panel and a drive bracket including a first side plate and a second side plate, the first side plate forms a securing post sliding thereon, the second side plate forms two rows of restricting pieces extending towards the first side plate, one edge of the back panel is inserted into the restricting pieces and resists against the second side plate, the securing post slides on the first side plate and resists against the other edge of the back panel, the back panel is secured between the first side plate and the second side plate of the drive bracket.

14 Claims, 4 Drawing Sheets

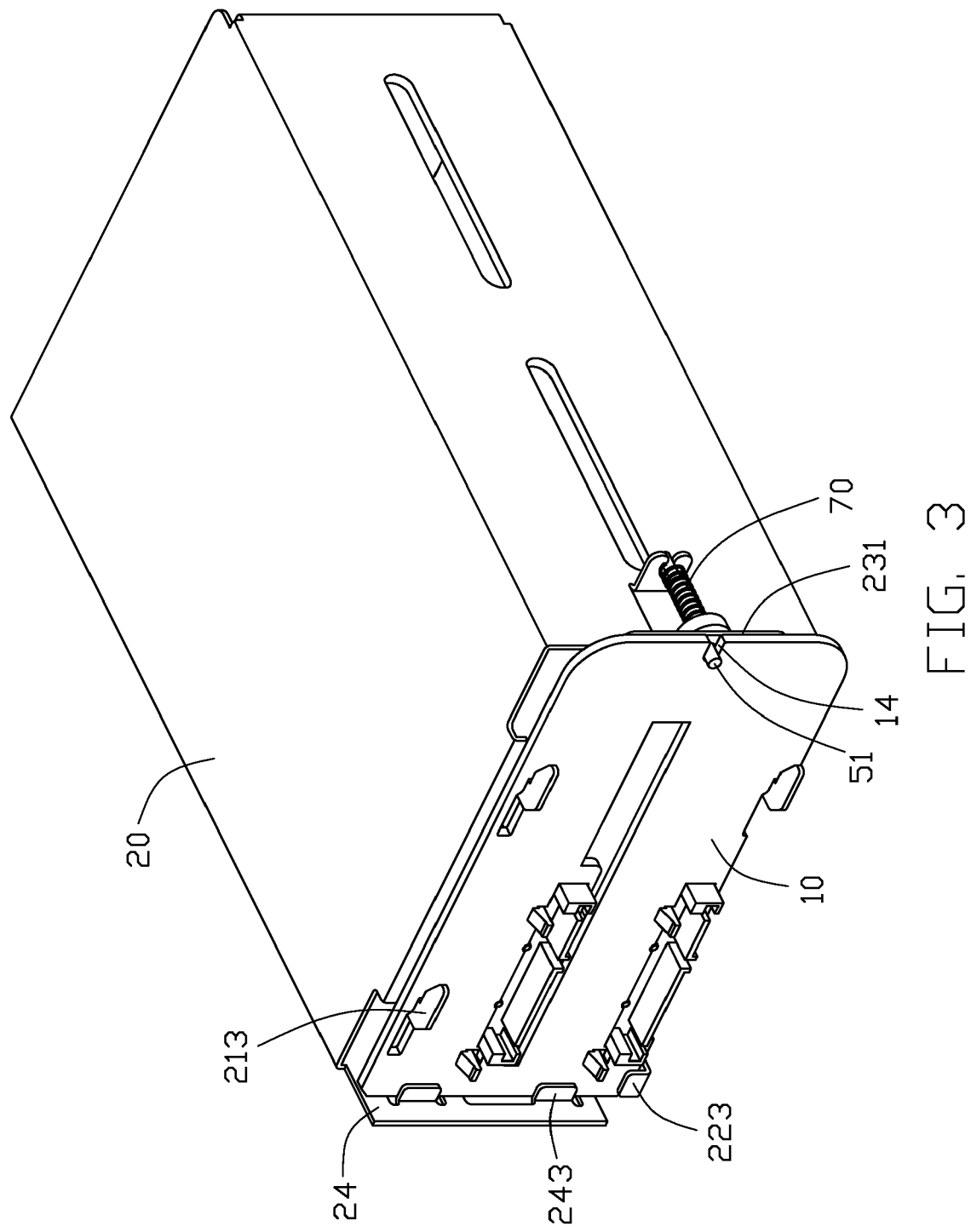

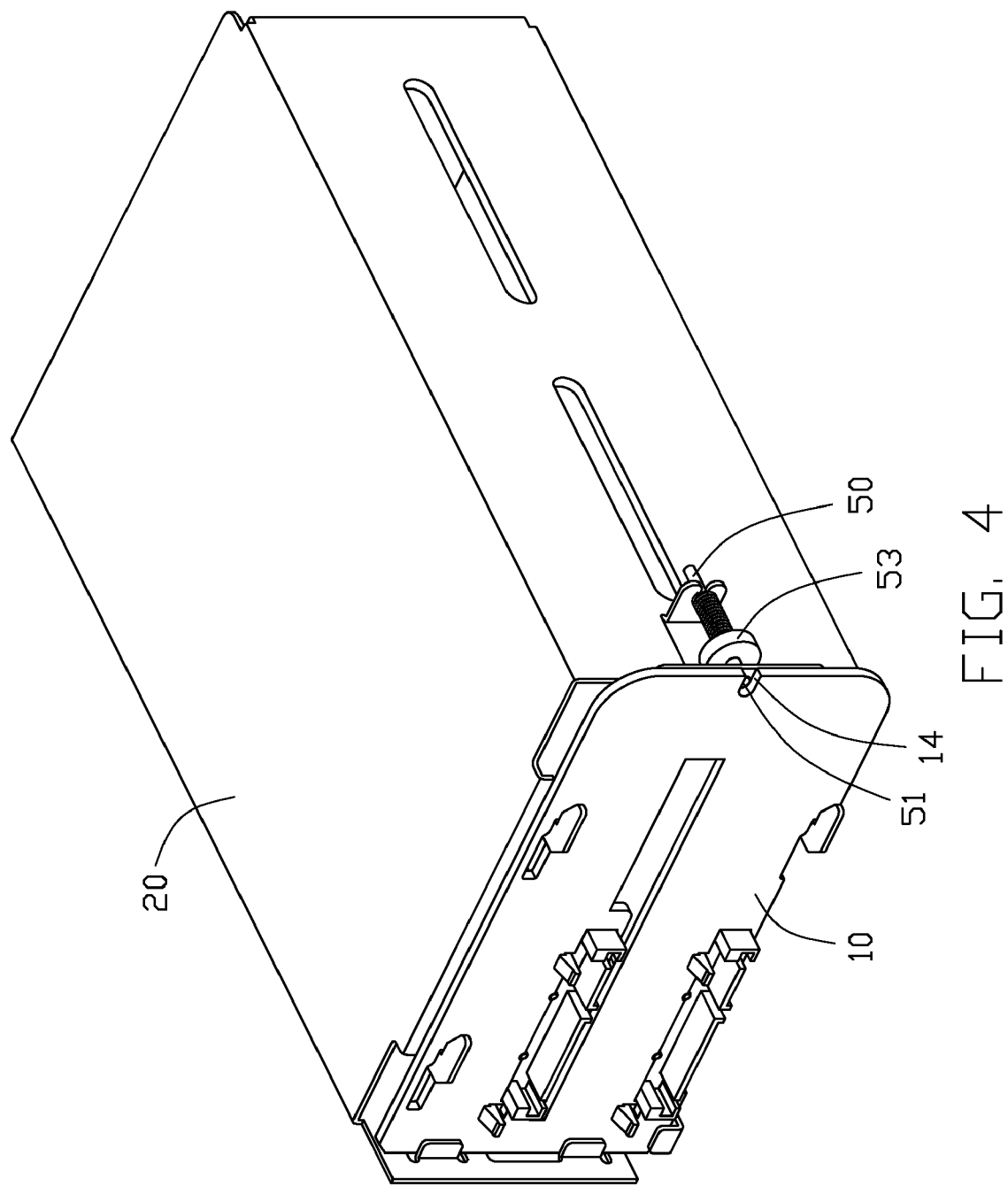

DRIVE BRACKET ASSEMBLY

BACKGROUND

1. Technical Field

The present invention relates to drive bracket assemblies, and more particularly to a drive bracket assembly with a back panel mounted thereon.

2. Description of Related Art

Generally, a plurality of large data storage devices is needed in a server. The data storage devices such as a hard disk drive (HDD) are attached to a drive bracket. The data storage devices are accommodated in the drive bracket with a back panel attached thereon.

In a drive bracket, a locking plate is provided to hold the back panel in place. The drive bracket includes a pair of sidewalls and a bottom wall. A plurality of posts is respectively disposed on the sidewalls and the bottom wall. The locking plate has two bent clips formed on opposite edges, and a bottom clip formed on a bottom edge. Two guiding slots and a through hole are defined in each bent clip, and two through holes are defined in the bottom clip. In assembly, the back panel together with the locking plate is inserted in the drive bracket between the sidewalls. The posts of the sidewalls of the drive bracket are slid into the guiding slots of the bent clips of the locking plate, and the posts of the bottom wall are inserted into the through holes of the bottom clip. Numerous fasteners are respectively engaged with the posts of the bottom wall of the drive bracket, and engaged in the through holes of the bent clips, thereby fixing the back panel and the locking clip into the drive bracket. However, the mounting apparatus has a complicated structure, and the manufacturing cost is high.

What is needed, therefore, is a drive bracket assembly for securing a back panel thereon with a simple structure.

SUMMARY

A drive bracket assembly includes a back panel and a drive bracket including a first side plate and a second side plate, the first side plate forms a securing post sliding thereon, the second side plate forms two rows of restricting pieces extending towards the first side plate, one edge of the back panel is inserted into the restricting pieces and resists against the second side plate, the securing post slides on the first side plate and resists against the other edge of the back panel, the back panel is secured between the first side plate and the second side plate of the drive bracket.

Other advantages and novel features of the present invention will become more apparent from the following detailed description of a preferred embodiment when taken in conjunction with the accompanying drawings, in which:

BRIEF DESCRIPTION OF THE DRAWINGS

FIG. 3 is an assembled view of FIG. 1; and

FIG. 4 is a disassembled view of FIG. 3.

DETAILED DESCRIPTION OF THE EMBODIMENT

Figure 1:
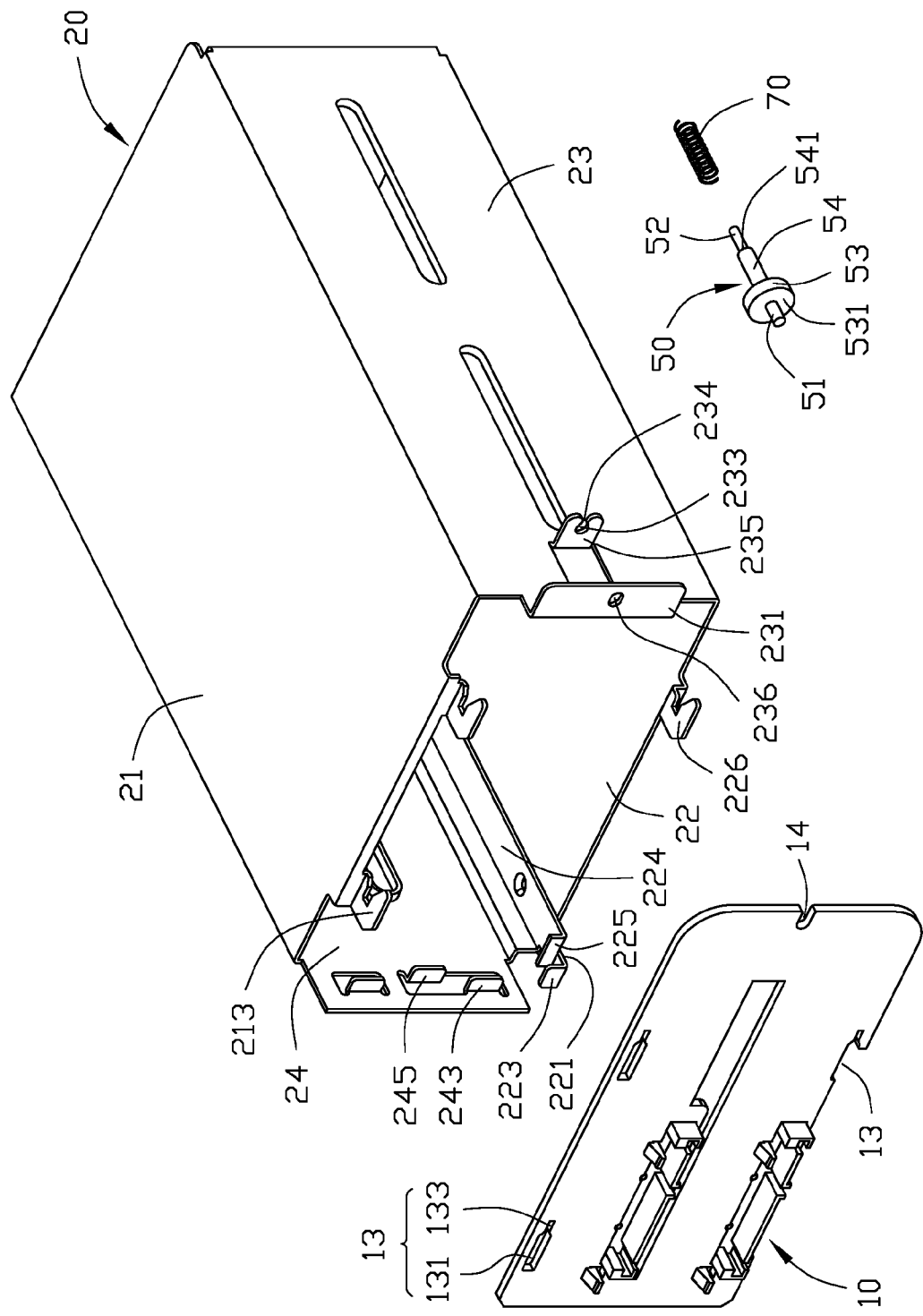
FIG. 1 is an exploded, isometric view of a drive bracket assembly in accordance with a preferred embodiment of the present invention.

Referring to FIG. 1, a drive bracket assembly in accordance with a preferred embodiment of the present invention includes a drive bracket 20, and a back panel 10 attached on the drive bracket 20.

The drive bracket 20 includes a top plate 21, a bottom plate 22, a first side plate 23, and a second side plate 24 parallel to the first side plate 23. The top plate 21 forms a pair of L-shaped hooks 213 on a rear portion thereof. An L-shaped hook 226 is formed on a rear portion of the bottom plate 22, adjacent to the first side plate 23. A bottom of the second side plate is bent horizontally to form a bent piece 224 located above the bottom plate 22. A flange 225 extends upwardly from an end of the bent piece 224. The bottom plate 22 extends rearwards to form a tongue piece 221 located below the bent piece 224. A flange 223 extends upwardly from an end of the tongue piece 221. The flanges 223, 225 are adjacent to the second side plate 24, and a distance between the flange 223 and the flange 225 is equal to a thickness of the back panel 10. Rear portions of the first side plate 23 are bent outwards to form a first fixing piece 231 and a second fixing piece 235. The first fixing piece 231 is parallel to the second fixing piece 235, and located behind the second fixing piece 235. The first fixing piece 231 defines a hole 236 therein. The second fixing piece 235 defines a hole 233 therein. A cutout 234 is defined in an edge of the second fixing piece 235, communicating with the hole 233. Two rows of restricting pieces 243, 245 extend perpendicularly inwards from a rear portion of the second side plate 24. The restricting piece 243 is coplanar with the flange 223, and the restricting piece 245 is coplanar with the flange 225.

The back panel 10 defines a plurality of securing holes 13 therein corresponding to the hook 213 and the hook 226. The securing hole 13 includes a wide portion 131 and a narrow portion 133 communicating with the wide portion 131. A horizontal slot 14 is defined in an edge of the back panel 10, corresponding to the hole 236 of the first side plate 23.

A securing post 50 is configured to be slidably secured on the first fixing piece 231 and the second fixing piece 235 of the first side plate 23. A first insert end 51 is formed on one end of the securing post 50 adapted to insert in the hole 236 of the first fixing piece 231. A second insert end 52 is formed on the other end of the securing post 50 adapted to insert into the hole 233 of the second fixing piece 235. The securing post 50 forms a stopping portion 53 and a post portion 54 between the first insert end 51 and the second insert end 52. The stopping portion 53 connects with the first insert end 51, and a first stopping plane 531 is formed at the joint of the stopping portion 53 and the first insert end 51. The post portion 54 connects with the second insert end 52, and a second stopping plane 541 is formed at the joint of the post portion 54 and the second insert end 52.

Figure 2:
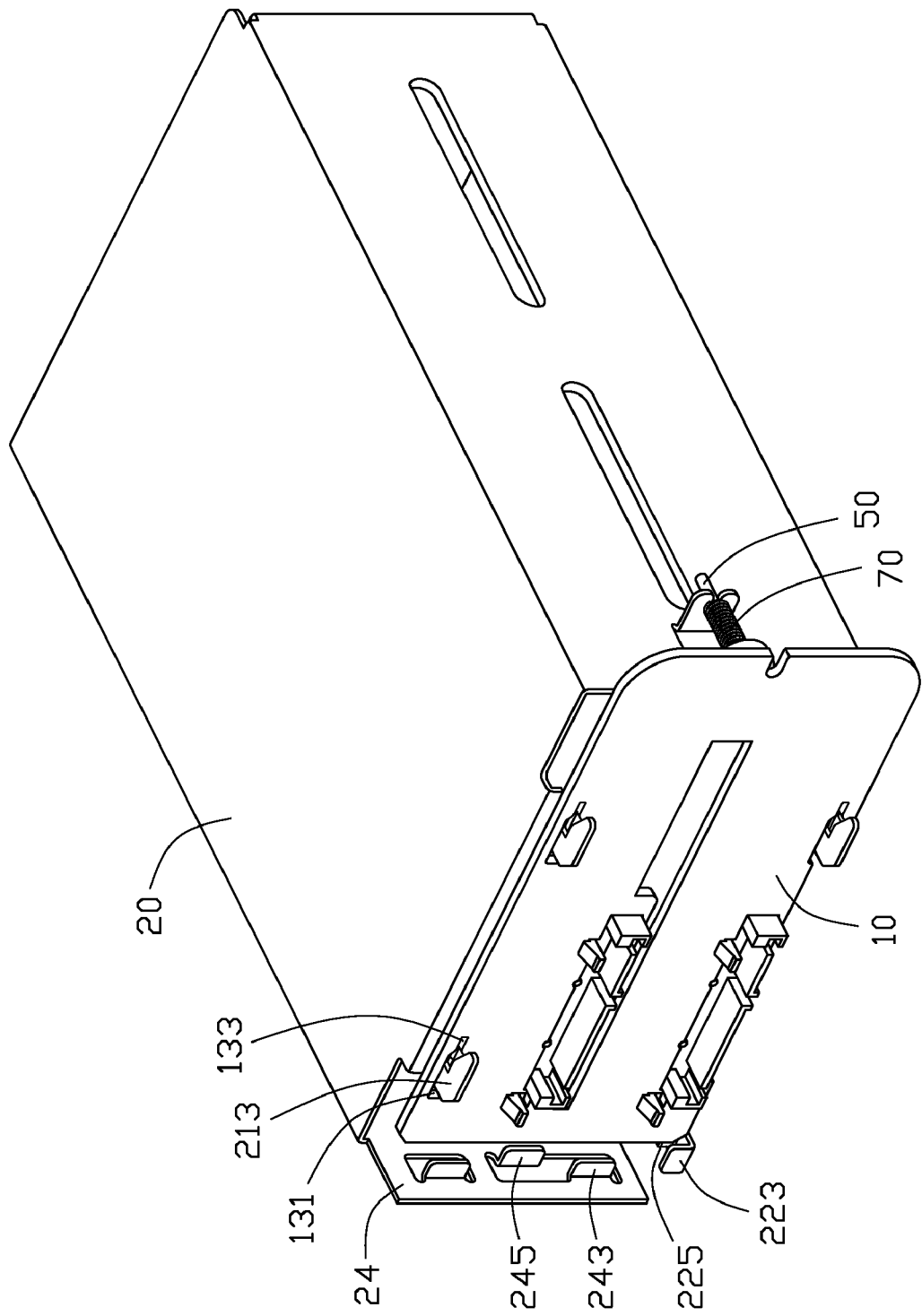
FIG. 2 is a partially-assembled isometric view of FIG. 1.

Referring to FIGS. 1 to 3, in assembly, a resilient member 70 is attached around the post portion 54 of the securing post 50. Then the first insert end 51 of the securing post 50 is inserted into the hole 236 of the first fixing piece 231. The second insert end 52 is pressed into the hole 233 of the second fixing piece 235 via the cutout 234. Thereby the securing post 50 is slidably mounted on the first fixing piece 231 and the second fixing piece 235. One end of the resilient member 70 resists against the stopping portion 53, and the other end resists against the second fixing piece 235 to resiliently deform the resilient member 70. The first stopping plane 531 of the stopping portion 53 resists against the first fixing piece 231 by the elastic force of the resilient member 70. The first insert end 51 protrudes from the first fixing piece 231 through the hole 236 of the first fixing piece 231.

The back panel 10 is moved towards the drive bracket 20. The hooks 213, 226 of the drive bracket 20 pass through the wide portion 131 of the corresponding securing hole 13 of the back panel 10. Then, the back panel 10 resists against the first insert end 51 pushed it back into the hole 236 of the first fixing piece 231. The back panel 10 is then moved towards the second side plate 24 until the back panel 10 is simultaneously sandwiched between the flange 223 and the flange 225, and between the restricting piece 243 and the restricting piece 245. Thereby the flanges 223, 225 and the restricting pieces 243, 245 prevent the back panel 10 from moving back and forth. The hooks 213, 226 of the drive bracket 20 slide in the securing holes 13 from the wide portion 131 to the narrow portion 133. The narrow portion 133 prevents the hooks 213, 226 from moving up and down. The hooks 213, 226 engage on the back panel 10. The slot 14 of the back panel 10 is aligned with the hole 236. The back panel 10 no longer resists against the first insert end 51, which is received in the hole 236. The securing post 50 is moved backwards by the elastic force of the resilient member 70. Thereby the first insert end 51 protrudes from the first fixing piece 231 again, and on into the slot 14, to prevent the back panel 10 from moving back. So the back panel 10 is attached on the backside of the drive bracket 20.

Referring to FIGS. 2 and 4, in disassembly, the stopping portion 53 of the securing post 50 is moved forward until the second stopping plane 541 of the post portion 54 resists against the second fixing piece 235. The first insert end 51 of the securing post 50 disengages from the slot 14 of the back panel 10. At that moment, the back panel 10 is moved towards the first side plate 23. The hooks 213, 226 move to the wide portion 131 of the securing hole 13. The back panel 10 is then moved backwards. The hooks 213, 226 of the drive bracket 20 are removed from the wide portion 131 of the securing hole 13. So the back panel 10 is removed from the drive bracket 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive bracket assembly, comprising:
a back panel comprising a first edge, a second edge, and a bottom edge connecting with the first edge and the second edge; and
a drive bracket comprising a first side plate, a second side plate parallel to the first side plate, and a bottom plate, a securing post slidable on the first side plate, the second side plate having two rows of restricting pieces extending towards the first side plate, two flanges extending upwards from a bottom portion of the drive bracket, the second edge of the back panel resisting against the second side plate and the securing post resisting against the first edge of the back panel to restrict the back panel moving in a first direction, the second edge of the back panel inserted between the restricting pieces and the bottom edge of the back panel inserted between the flanges to restrict the back panel moving in a second direction perpendicular to the first direction;
wherein the securing post is capable of moving along the second direction;
wherein the fist side plate has a first fixing piece and a second fixing piece, a hole is defined in each fixing piece respectively, the securing post has a first insert end inserted into the hole of the first fixing piece, and a second insert end inserted into the hole of the second fixing piece; and
wherein the securing post forms a stopping portion, which has a diameter larger than a diameter of the hole of the first fixing piece, between the first insert end and the second insert end, a resilient member is attached around the securing post, and compressed between the stopping portion and the second fixing piece to urge the stopping portion resisting against the first fixing piece to have the first insert end protruded from the first fixing piece through the hole of the first fixing piece to resist against the first edge of the back panel.

2. The drive bracket assembly as described in claim 1, wherein a slot is defined in the first edge of the back panel, and the first insert end resist against a bottom of the slot.

3. The drive bracket assembly as described in claim 1, wherein the securing post forms a post portion between the stopping portion and the second insert end adapted for mounting the resilient member around thereof, the securing post slidable on the first and second fixing piece to have the first insert end drawn back in the hole of the first fixing piece thereby disengaged from the first edge of the back panel when an end of the post portion resisting against the second fixing piece.

4. The drive bracket assembly as described in claim 1, wherein a bottom of the second side plate is bent horizontally to form a bent piece located above the bottom plate, one of the two flanges extends upwardly from an end of the bent piece, the bottom plate extends rearwards to form a tongue piece located below the bent piece, the other of the two flanges extends upwardly from an end of the tongue piece.

5. The drive bracket assembly as described in claim 1, wherein a cutout is defined in the edge of the second fixing piece, communicating with the hole of the second fixing piece.

6. The drive bracket assembly as described in claim 1, wherein the drive bracket comprises a plurality of L-shaped hooks, the back panel defines a plurality of securing holes corresponding to the hooks, each securing hole comprises a wide portion for the corresponding hook passing through, and a narrow portion restricting the corresponding hook therein.

7. The drive bracket assembly as described in claim 1, wherein an end of the securing post resists against the back panel when the back panel disengages from the drive bracket.

8. A drive bracket assembly, comprising:
a back panel; and
a drive bracket comprising a first side plate and a second side plate, a securing post slidable on the first side plate, the second side plate having two rows of restricting pieces extending towards the first side plate, a second edge of the back panel inserted between the restricting pieces and resisting against the second side plate, the securing post sliding on the first plate and resisting against a first edge of the back panel, thereby the back panel secured between the first side plate and the second side plate of the drive bracket;
wherein the drive bracket comprises a bottom plate, a bottom of the second side plate is bent horizontally to form a bent piece located above the bottom plate, one of two flanges extends upwardly from an end of the bent piece, the bottom plate extends rearwards to form a tongue piece located below the bent piece, the other of the two flanges extends upwardly from an end of the tongue piece.

9. The drive bracket assembly as described in claim 8, wherein the first side plate has a first fixing piece and a second fixing piece, a hole is defined in each fixing piece respectively, the securing post has a first insert end inserted into the hole of the first fixing piece, and a second insert end inserted into the hole of the second fixing piece.

10. The drive bracket assembly as described in claim 9, wherein the securing post forms a stopping portion which has a diameter larger than a diameter of the hole of the first fixing piece between the first insert end and the second insert end, a resilient member is attached around the securing post, and compressed between the stopping portion and the second fixing piece to urge the stopping portion resisting against the first fixing piece to have the first insert end protruded from the first fixing piece through the hole of the first fixing piece to resist against the first edge of the back panel.

11. The drive bracket assembly as described in claim 10, wherein a slot is defined in the first edge of the back panel, and the first insert end resist against a bottom of the slot.

12. The drive bracket assembly as described in claim 10, wherein the securing post forms a post portion between the stopping portion and the second insert end adapted for mounting the resilient member around thereof, the securing post slidable on the first and second fixing piece to have the first insert end drawn back in the hole of the first fixing piece thereby disengaged from the first edge of the back panel when an end of the post portion resisting against the second fixing piece.

13. The drive bracket assembly as described in claim 9, wherein a cutout is defined in the edge of the second fixing piece, communicating with the hole of the second fixing piece.

14. The drive bracket assembly as described in claim 8, wherein the drive bracket comprises a plurality of L-shaped hooks, the back panel defines a plurality of securing holes corresponding to the hooks, each securing hole comprises a wide portion for the corresponding hook passing through, and a narrow portion restricting the corresponding hook therein.

\* \* \* \* \*